United States Patent
Sung (10) Patent No.: US 11,127,296 B2
(45) Date of Patent: Sep. 21, 2021

(54) APPARATUS AND METHOD FOR INDUCING SAFE DRIVING OF A SURROUNDING VEHICLE

(71) Applicants: HYUNDAI MOTOR COMPANY, Seoul (KR); KIA MOTORS CORPORATION, Seoul (KR)

(72) Inventor: Ki Jun Sung, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/815,758

(22) Filed: Mar. 11, 2020

(65) Prior Publication Data

US 2021/0056851 A1    Feb. 25, 2021

(30) Foreign Application Priority Data

Aug. 19, 2019  (KR) ........................ 10-2019-0101208

(51) Int. Cl.
| | |
|---|---|
| *G08G 1/16* | (2006.01) |
| *G06K 9/00* | (2006.01) |
| *B60Q 1/50* | (2006.01) |
| *G01S 13/58* | (2006.01) |
| *B60R 11/04* | (2006.01) |
| *B60R 11/00* | (2006.01) |

(52) U.S. Cl.
CPC ............. *G08G 1/165* (2013.01); *B60Q 1/50* (2013.01); *B60R 11/04* (2013.01); *G01S 13/58* (2013.01); *G06K 9/00369* (2013.01); *G06K 9/00805* (2013.01); *B60R 2011/0003* (2013.01)

(58) Field of Classification Search
CPC ...................................... G08G 1/165
See application file for complete search history.

(56) References Cited

U.S. PATENT DOCUMENTS

| | | | | |
|---|---|---|---|---|
| 8,791,811 | B2* | 7/2014 | Park ...................... | B60Q 1/525 340/468 |
| 9,787,951 | B2* | 10/2017 | Kannon ................. | G08G 1/168 |
| 2014/0197939 | A1* | 7/2014 | Stefan ................... | G08G 1/168 340/435 |

(Continued)

FOREIGN PATENT DOCUMENTS

| | | |
|---|---|---|
| KR | 20180071228 A | 6/2018 |
| KR | 20180085585 A | 7/2018 |

*Primary Examiner* — Travis R Hunnings
(74) *Attorney, Agent, or Firm* — Lempia Summerfield Katz LLC (57) ABSTRACT

An apparatus and a method for inducing safe driving of a surrounding vehicle are applied to a vehicle parked on a road and may identify an object (surrounding vehicle, pedestrian) based on an image obtained by a camera photographing an approaching object. The apparatus and method blink a lamp of the parked vehicle according to the identified object, thus preventing a traffic accident occurring due to the parked vehicle. The apparatus includes: a plurality of lamps mounted on an external portion of the parked vehicle; a camera provided in the parked vehicle and configured to photograph a surrounding image; and a controller configured to identify an object approaching the parked vehicle in the surrounding image photographed by the camera and blink at least one lamp according to the identified object.

17 Claims, 7 Drawing Sheets

(56) References Cited

U.S. PATENT DOCUMENTS

| | | | |
|---|---|---|---|
| 2018/0361992 A1* | 12/2018 | Takagi | B60Q 1/323 |
| 2019/0180114 A1* | 6/2019 | Sabeti | B60Q 9/008 |
| 2020/0082177 A1* | 3/2020 | Sabeti | G06K 9/00805 |
| 2020/0389330 A1* | 12/2020 | Longardner | H02J 7/0045 |

* cited by examiner

APPARATUS AND METHOD FOR INDUCING SAFE DRIVING OF A SURROUNDING VEHICLE

CROSS-REFERENCE TO RELATED APPLICATION

This application claims the benefit of priority to Korean Patent Application No. 10-2019-0101208, filed in the Korean Intellectual Property Office on Aug. 19, 2019, the entire contents of which are incorporated herein by reference.

TECHNICAL FIELD

The present disclosure relates to a technique to induce safe driving of a surrounding vehicle. The technique is applied to a vehicle parked on a road.

BACKGROUND

In general, freight vehicles weighing more than 2.5 tons should be parked in a private parking lot because it is not possible for such vehicles to enter a general parking lot. However, the location of the private parking lot is typically located far away from a driver's residence.

Therefore, drivers need to commute to the private parking lot using public transportations or their own cars. Drivers need to commute to their residences in the same manner when their work is finished.

For freight drivers, time is money and thus this waste of time is also directly related to their livelihoods. Therefore, some drivers often park their freight vehicles on secluded roads closer to their homes.

These freight vehicles occupy the outermost lane (Lane) of a road because they are large in size. When a driver driving a vehicle behind a parked freight vehicle in the same lane at night does not notice the freight vehicle, it can lead to an accident.

Accordingly, there is a need to provide a method for inducing safe driving of a surrounding vehicle approaching a vehicle parked on a road at night.

SUMMARY

The present disclosure has been made to solve the above-mentioned problems occurring in the prior art while advantages achieved by the prior art are maintained intact.

An object of the present disclosure is to provide an apparatus and method for inducing safe driving of a surrounding vehicle relative to a parked vehicle. The apparatus and method are applied to a vehicle parked on a road and are capable of identifying an approaching object (a surrounding vehicle, a pedestrian, or the like) based on an image photographed by a camera. The apparatus and method are also capable of blinking a lamp of the parked vehicle according to the identified object. Thus, traffic accidents caused by the parked vehicle may be prevented in advance.

The objects of the present disclosure are not limited to the above-mentioned objects. Other objects and advantages of the present disclosure that are not mentioned may be understood by the following description and should be more clearly understood by embodiments of the present disclosure. It should also be readily apparent that the objects and advantages of the present disclosure may be realized by means of the instrumentalities and combinations particularly pointed out in the appended claims.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, an apparatus for inducing safe driving of a surrounding vehicle includes a plurality of lamps mounted on an external portion of a vehicle. The apparatus further includes a camera provided in the vehicle and configured to photograph a surrounding image. The apparatus further includes a controller configured to identify an object approaching the vehicle, when the vehicle is parked, in the surrounding image photographed by the camera. The controller is further configured to blink at least one lamp of the plurality of lamps according to the identified object.

The controller may induce safe driving of the surrounding vehicle by blinking the at least one lamp of the plurality of lamps provided in the parked vehicle. The objects can be a pedestrian, the surrounding vehicle, or anything approaching the parked vehicle.

The apparatus may further include a radar configured to measure a speed of the surrounding vehicle approaching the parked vehicle.

The controller may wake up the radar when the identified object is the surrounding vehicle. The controller may further blink the at least one lamp of the plurality of lamps provided in the parked vehicle when the speed of the surrounding vehicle measured by the radar exceeds a threshold speed. In this embodiment, the controller may selectively blink at least one lamp mounted on a right side of the parked vehicle or at least one lamp mounted on a left side of the parked vehicle according to a direction or location of the surrounding vehicle approaching the vehicle. In one example, the controller may blink the at least one lamp located on the left side of the parked vehicle when the surrounding vehicle approaches a rear of the parked vehicle. The controller may blink the at least one lamp located on the right side of the parked vehicle when the surrounding vehicle approaches a front of the parked vehicle.

The apparatus may further include a buzzer configured to output a warning sound. In this embodiment, the controller may induce safe driving of the surrounding vehicle by blinking the at least one lamp of the plurality of lamps provided in the vehicle while outputting the warning sound through the buzzer. The blinking and the outputting are performed when the identified object includes a pedestrian as a first object and the surrounding vehicle as a second object.

Furthermore, the controller may monitor a voltage of a battery of the parked vehicle and turn off the at least one lamp of the plurality of lamps when the voltage of the battery drops below a reference voltage.

The apparatus may further include an illumination sensor mounted on the external portion of the parked vehicle and configured to measure an ambient illumination. The apparatus may further comprise a navigation device configured to provide road information on a road on which the parked vehicle is located. In this embodiment, the controller may identify the object approaching the parked vehicle from the surrounding image photographed by the camera. The controller may further blink the at least one lamp of the plurality of lamps according to the identified object when the parked vehicle is located on the road at night.

The controller may determine whether the identified object approaches the parked vehicle based on the road information.

According to another aspect of the present disclosure, a method for inducing safe driving of a surrounding vehicle includes photographing a surrounding image of a vehicle. The method further includes identifying an object approaching the vehicle, when parked, from the photographed surrounding image. The method further includes blinking at least one lamp of a plurality of lamps mounted on an external portion of the parked vehicle according to the identified object.

The blinking of the at least one lamp of the plurality of lamps may include inducing safe driving of the surrounding vehicle by blinking an emergency light when the identified object is a pedestrian. In another embodiment, the blinking may include inducing safe driving of the surrounding vehicle by blinking a position lamp when the identified object is the surrounding vehicle. In another embodiment, the blinking may include inducing safe driving of the surrounding vehicle by blinking an emergency light while outputting a warning sound when the identified object includes a pedestrian as a first object and the surrounding vehicle as a second object.

In one embodiment, the inducing of safe driving of the surrounding vehicle by blinking the position lamp may be performed when a speed of the surrounding vehicle approaching the parked vehicle exceeds a threshold speed.

Furthermore, the inducing of safe driving of the surrounding vehicle by blinking the position lamp may include selectively blinking position lamps mounted on a right side or a left side of the parked vehicle. The position lamps may be selectively blinked according to a direction of the surrounding vehicle approaching the parked vehicle. In other words, the method may include blinking the position lamp located on the left side of the parked vehicle when the surrounding vehicle approaches a rear of the parked vehicle. The method may include blinking the position lamp located on the right side of the parked vehicle when the surrounding vehicle approaches a front of the parked vehicle. Which position lamp is blinked may also depend on the direction of approach the surrounding vehicle, which side of the road the parked vehicle is parked, and which direction the parked vehicle is facing.

The blinking of the at least one lamp of the plurality of lamps may include monitoring a voltage of a battery of the parked vehicle. The blinking of the lamp may further include turning off the at least one lamp of the plurality of lamps when the voltage of the battery drops below a reference voltage.

Furthermore, the photographing of the surrounding image of the parked vehicle may be performed when the parked vehicle is located on a road at night.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure are be described in detail with reference to the drawings. In adding the reference numerals to the components of each drawing, it should be noted that an identical or equivalent component is designated by an identical numeral even when they are displayed on other drawings. Further, in describing an embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 1:
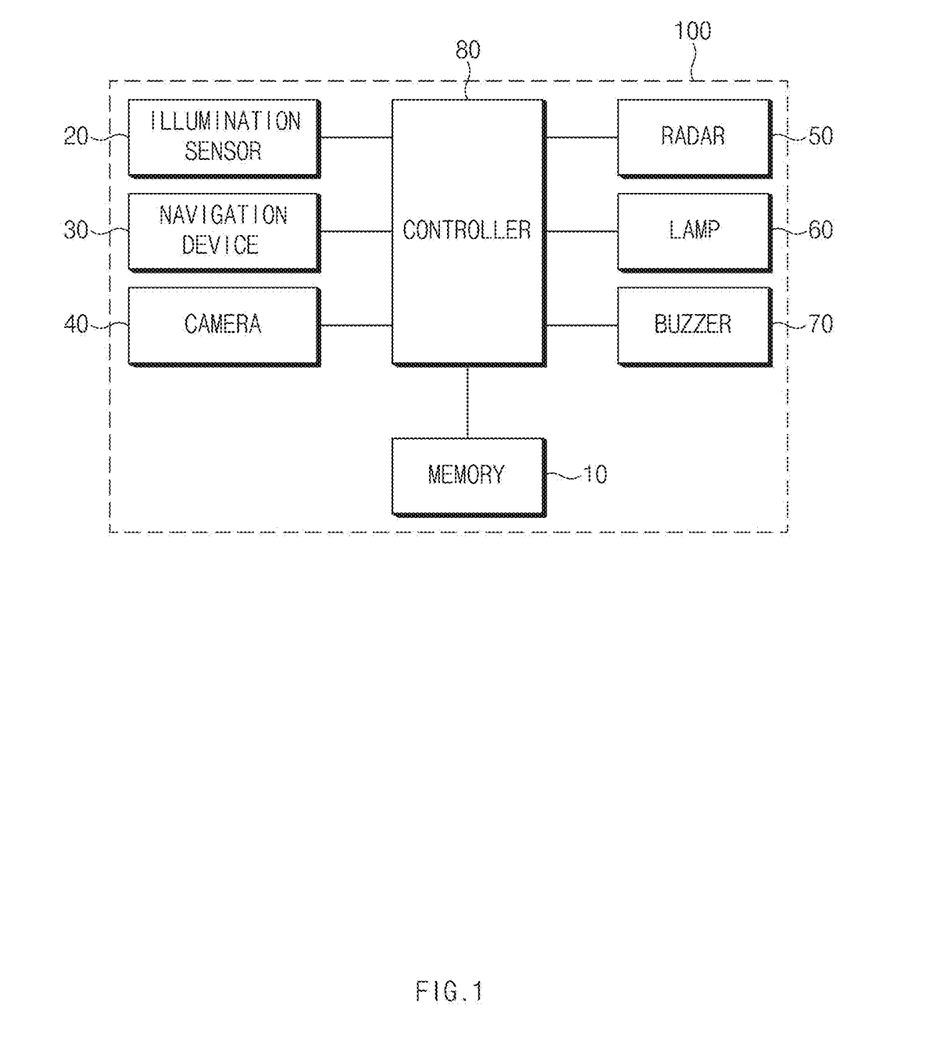
FIG. 1 is a block diagram of an apparatus for inducing safe driving of a surrounding vehicle according to an embodiment of the present disclosure.

FIG. 1 is a block diagram of an apparatus for inducing safe driving of a surrounding vehicle according to an embodiment of the present disclosure.

As shown in FIG. 1, an apparatus 100 for inducing safe driving of a surrounding vehicle according to an embodiment of the present disclosure may include a memory 10, an illumination sensor 20, a navigation device 30, a camera 40, a radar 50, a lamp 60, a buzzer 70, and a controller 80. In this embodiment, according to methods of implementing the apparatus 100 for inducing safe driving of the surrounding vehicle of the present disclosure, the components may be combined with each other to one entity, or some components may be omitted.

The components described above are described below. First, the memory 10 may store various logics, algorithms, and programs required in a process of identifying an approaching object (a surrounding vehicle, a pedestrian, and the like). The process is based on an image photographed by the camera and a blinking of a lamp of the vehicle according to the identified approaching object. The process and the logics, algorithms, and programs are applied to a vehicle parked on the road.

The memory 10 may store an object detection algorithm used to detect an object, such as a surrounding vehicle and a pedestrian in the front/rear image of the vehicle photographed by the camera 40.

The memory 10 may store a threshold value used to determine whether it is night or daytime based on an illuminance value measured by the illumination sensor 20. The memory 10 may further store a critical speed used to determine whether to induce the safe driving of the surrounding vehicle based on a speed of the surrounding vehicle measured by the radar 50.

The memory 10 may include at least one type storage medium of a memory, such as a flash memory type, a hard disk type, a micro type, a card type (e.g., an SD (Secure Digital) card or an XD (eXtream Digital) card), RAM (Random Access Memory), SRAM (Static RAM), ROM (Read-Only Memory), PROM (Programmable ROM), EEPROM (Electrically Erasable PROM), magnetic RAM (MRAM), a magnetic disk, and an optical disk type of memory.

The illumination sensor 20 may be mounted on an external portion of the vehicle to measure the brightness (illuminance) of the surroundings. The illumination sensor 20 may be used for determining whether it is night or daytime. The illumination sensor 20 may be further used for determining a dark place even during daytime or a bright place due to a street light even at night.

The navigation device 30 may be mounted in a vehicle to provide the controller 80 with a speed of the vehicle, a current location (whether there is on a road or not) based on map data, and the like. In other words, the navigation device 30 may provide the controller 80 with information (hereinafter, road information) indicating that the vehicle is currently located on the road. In this embodiment, the road may include a street lamp. In addition, the road information may include a road shape, a road structure, a driving direction of a vehicle, an intersection, a branch point, and the like.

The navigation device 30 may include a global positioning system (GPS) module configured to receive a GPS signal from a satellite and generate first location data based on the received GPS signal. The navigation device 30 may further include a DeadReckoning (DR) sensor configured to generate second location data based on a driving direction of the vehicle and a speed of the vehicle. The navigation device 30 may further include a memory configured to store map data and a variety of information. The navigation device 30 may further include a map matching device configured to estimate a location of the vehicle based on the first location data and the second location data. The map matching device is further configured to match the estimated location of the vehicle to a link (map matching link or map matching road) in map data and output the matched map information (map matching result).

The camera 40 may include a front camera configured to photograph a front image of the vehicle and a rear camera configured to photograph a rear image of the vehicle. The camera 40 may include an infrared camera capable of photographing an object even in a place where there is no light.

The radar (RAdio Detecting And Ranging) 50 may include a front radar configured to monitor a front area of the vehicle and a rear radar configured to monitor a rear area of the vehicle. In this embodiment, the front radar may be mounted at the front of the vehicle and the rear radar may be mounted at the rear of the vehicle.

The radar 50 may measure a speed of a surrounding vehicle approaching in the same lane as the vehicle parked on the road.

The lamp 60 may be classified into an illumination lamp, a signaling lamp, and a display lamp. The illumination lamp is configured to illuminate a long-distance area, a short distance area, or a rear area. The signaling lamp is configured to represent a braking, a turning direction, or an emergency situation. The display lamp is configured to indicate a vehicle width, a vehicle height, a license plate lighting, and that parking is in progress.

The plurality of lamps may include lamps provided in a front portion of an external surface of the vehicle and may include a head lamp, a fog lamp, a side lamp, a direction indicating lamp, and the like. The head lamp is configured to illuminate a road. The fog lamp is configured to direct light to the front on the road to illuminate a shoulder. This enables the driver to find a direction when fog occurs. The side lamp is configured to indicate the boundary of the width of the vehicle. The direction indicating lamp is configured to signal a direction change when a direction of the vehicle is changed. The head lamp may include a high beam lamp configured to illuminate a road at a long distance (about 100 m) and a low beam lamp configured to illuminate a road at a short distance (about 30 m).

The plurality of lamps may include lamps provided at a rear portion of the external surface of the vehicle and may include a side lamp, a direction indicator lamp, a tail lamp, a brake lamp, a backup lamp, and the like. The side lamp is configured to indicate the boundary of the vehicle width. The direction indicator lamp is configured to signal a direction change. The tail lamp is automatically turned on when the head lamp is turned on. The brake lamp is configured to provide a warning for breaking to a trailing vehicle behind the when a driver of the vehicle presses a brake pedal. The backup lamp is configured to provide a warning to a pedestrian behind the vehicle when the vehicle moves backward.

A position lamp provided on the left/right side of the external surface of the vehicle may be a lamp mounted at the front/rear/left/right end of the vehicle to represent a form or shape of a large vehicle at night. The position lamp may include a FR (Front Right) lamp, an RR (Rear Right) lamp, an EOML (End Outline Marker Lamp) and the like.

The buzzer 70 may be a module configured to output a warning sound and may be implemented with a horn provided in the vehicle.

The controller 80 may perform an overall control such that each of the above components normally performs its function. The controller 80 may be implemented in the form of hardware or software or may be implemented in a combination of hardware and software. In another embodiment, the controller 80 may be implemented with a microprocessor, but is not limited thereto.

In an embodiment, the controller 80 may perform a variety of controls required in a process of identifying an approaching object based on an image photographed by the camera and a blinking of a lamp of the vehicle according to the identified approaching object. The variety of controls is applied to a vehicle parked on the road.

The controller 80 may activate/deactivate the safe driving inducing function of a surrounding vehicle according to ON/OFF. The ON/OFF is input from the user through a user setting mode (USM) of a cluster provided in the vehicle or a USM of an audio video navigation (AVN) system. In other words, the user may turn ON/OFF, through a USM, the apparatus 100 for inducing safe driving of a surrounding vehicle according to an embodiment of the present disclosure.

The controller 80 may allow the camera 40 to photograph a front image and a rear image of the vehicle when an illumination value measured by the illumination sensor 20 is less than a threshold value (nighttime) and it is determined that the vehicle is parked on the road. The determination is performed through information provided from the navigation device 30 when a safe driving inducing function of the surrounding vehicle is turned on. In this embodiment, the controller 80 may further determine whether the vehicle is parked by further using information on whether an engine is operating through a vehicle network.

The controller 80 may detect an object from an image photographed by the camera 40 and then identify a type of the object (a vehicle or a pedestrian). In this embodiment, the technology for detecting an object in an image itself is generally well known and is not the gist of the present disclosure. Thus, a detailed description thereof has been omitted.

Hereinafter, the operation of the controller 80 according to the type of an object is described in detail with reference to FIGS. 2A and 2B.

Figure 2A:
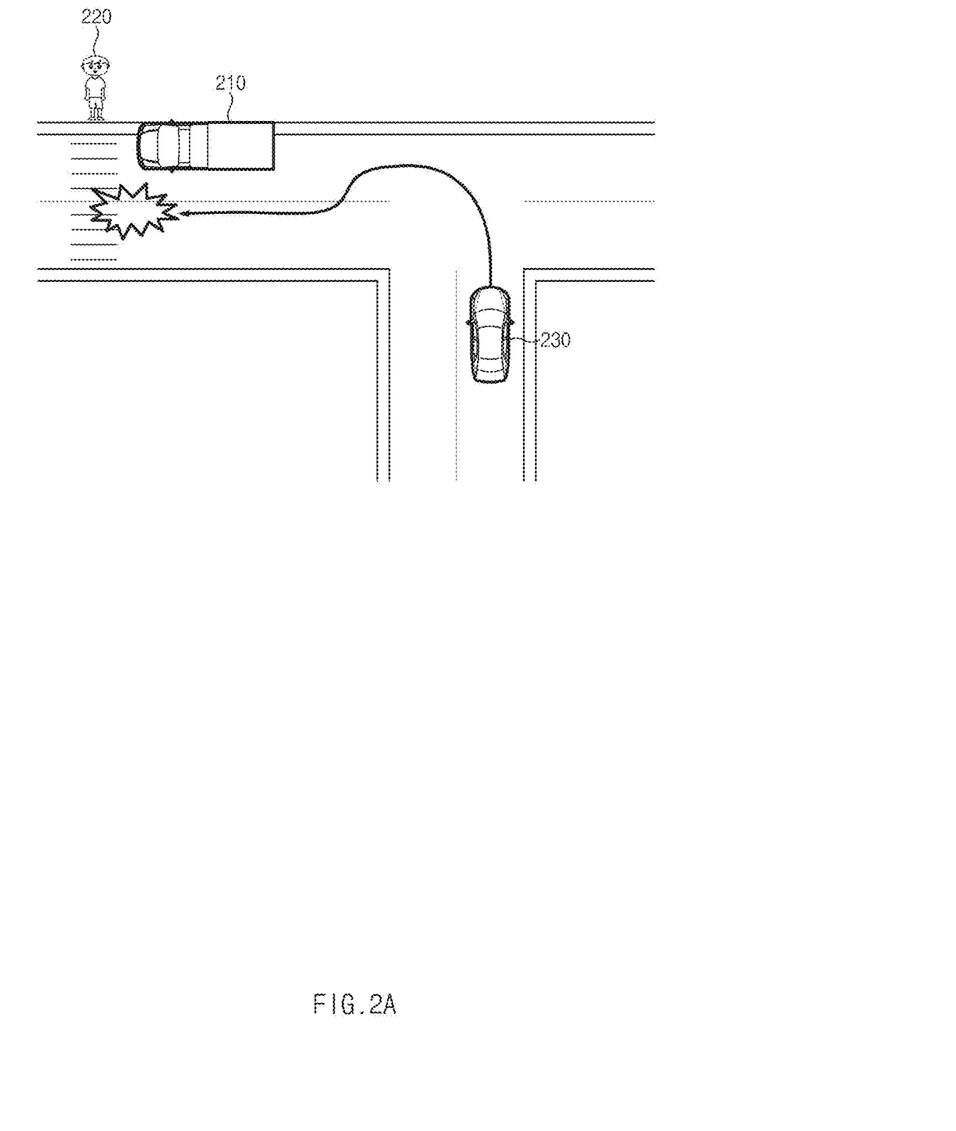
FIG. 2A is a diagram illustrating a situation in which a controller detects a pedestrian as an object and the controller is provided in an apparatus for inducing safe driving of a surrounding vehicle according to an embodiment of the present disclosure.

FIG. 2A is a diagram illustrating a situation in which a controller 80 detects a pedestrian as an object. The controller 80 is provided in an apparatus for inducing safe driving of a surrounding vehicle according to an embodiment of the present disclosure.

As shown in FIG. 2A, a vehicle 210 is parked on the intersection. The vehicle 210 is equipped with the apparatus 100 for inducing safe driving of a surrounding vehicle 230 according to an embodiment of the present disclosure.

When the controller 80 detects a pedestrian 220 as an object, the controller 80 may blink an emergency light of the lamps 60 provided in the vehicle 210 to inform a surrounding vehicle 230 that there is a pedestrian in front of the vehicle 210. Thus, the safe driving of the surrounding vehicle 230 is induced. In other words, a driver of the surrounding vehicle 230 may notice the blinking of the emergency light of the vehicle 210 parked in a driving direction, stop at the rear of the vehicle 210, and carefully pass the vehicle 210 through a left lane. In this process, the pedestrian 220 enters the driver's view of the surrounding vehicle 230 and thus a collision with the pedestrian 220 is prevented.

When the surrounding vehicle 230 is approaching the vehicle 210, the controller 80 may inform the surrounding vehicle 230 that there is a pedestrian in front of the vehicle 210 by blinking the emergency light of the lamps 60 provided in the vehicle 210. In this embodiment, the controller 80 may more clearly determine whether the surrounding vehicle 230 is or is not approaching the vehicle 210 based on the road information obtained through the navigation device 30.

Figure 2B:
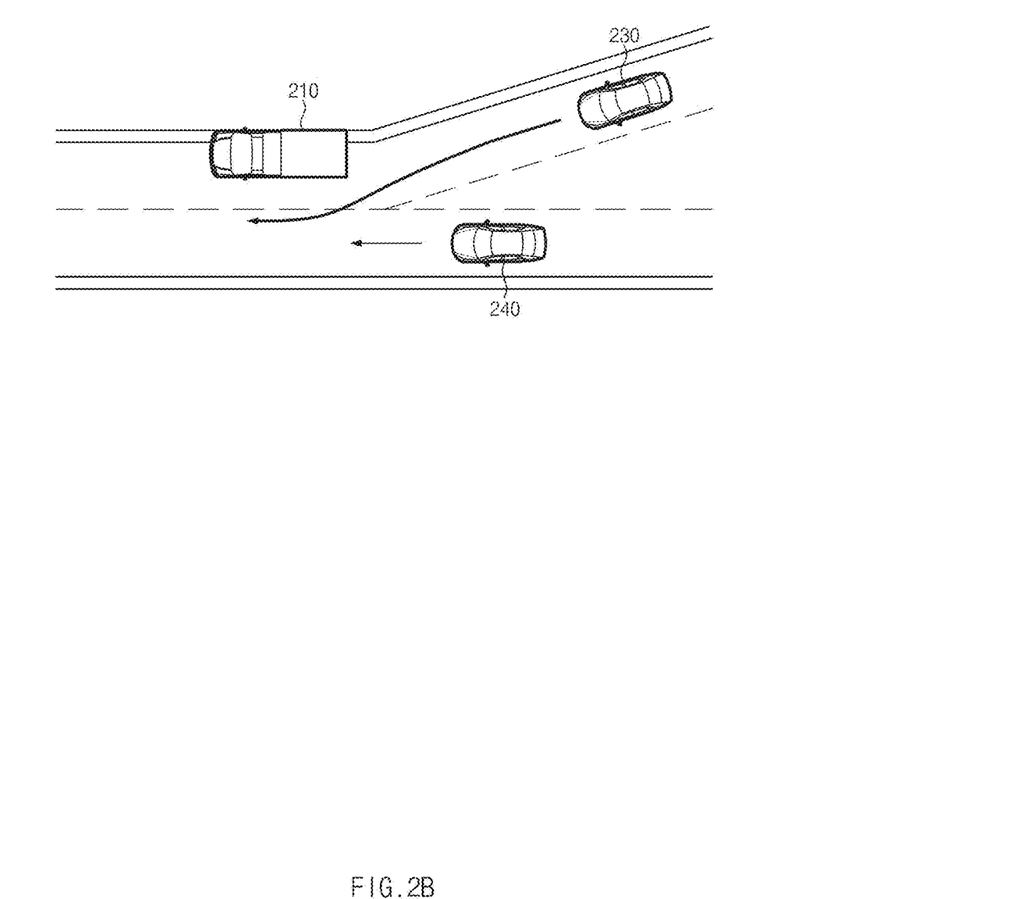
FIG. 2B is a diagram illustrating a situation in which a controller detects a surrounding vehicle as an object and the controller is provided in an apparatus for inducing safe driving of the surrounding vehicle according to an embodiment of the present disclosure.

FIG. 2B is a diagram illustrating a situation in which a controller 80 detects a sounding vehicle as an object. The controller 80 is provided in an apparatus for inducing safe driving of a surrounding vehicle according to an embodiment of the present disclosure.

As shown in FIG. 2B, the vehicle 210 is parked on a merge road. The vehicle 210 is equipped with the apparatus 100 for inducing safe driving of the surrounding vehicle 230 according to the embodiment of the present disclosure.

When the controller 80 detects the surrounding vehicle 230 as an object, the controller 80 may wake up the radar 50 to detect a speed of the surrounding vehicle 230. In this embodiment, the surrounding vehicle 230 may refer to a vehicle approaching the parked vehicle 210 in the same lane.

When a speed of the surrounding vehicle 230 exceeds a threshold speed (for example, 30 kph), the controller 80 may inform the surrounding vehicle 230 that the vehicle 210 is parked and induce the safe driving of the surrounding vehicle 230 by blinking a position lamp among the lamps 60. In other words, the driver of the surrounding vehicle 230 may notice the blinking of the position lamp of the vehicle 210 parked in the driving direction. The driver of the surrounding vehicle 230 may stop at the rear of the vehicle 210. When a vehicle 240 is driving in a lane, into which the surrounding vehicle 230 is about to change, and passes the surrounding vehicle 230, the driver of the surrounding vehicle 230 may change its lane and drive. In this process, the surrounding vehicle 230 may prevent a collision with the parked vehicle 210.

The controller 80 may more clearly determine whether the surrounding vehicle 230 or 240 is or is not approaching the vehicle 210 based on the road information obtained through the navigation device 30.

Figure 3A:
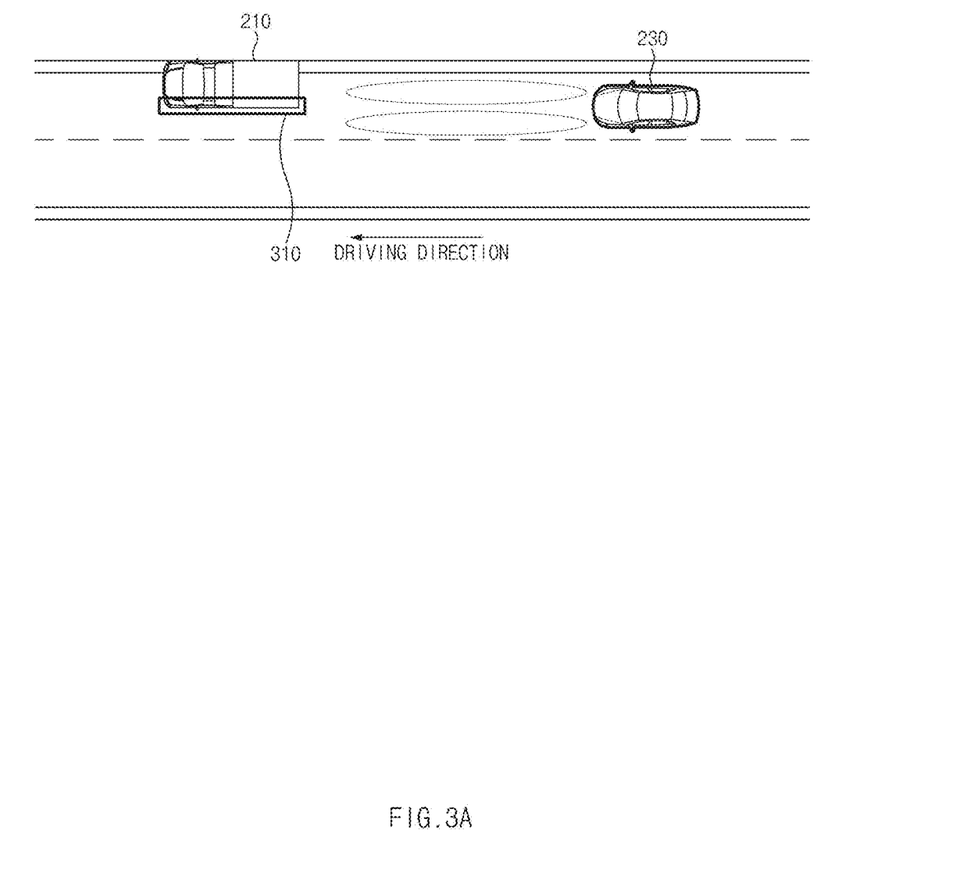
FIG. 3A is a diagram illustrating a situation in which a controller blinks a position lamp located on a left side of a vehicle and the controller is provided in an apparatus for inducing safe driving of a surrounding vehicle according to an embodiment of the present disclosure.
Figure 3B:
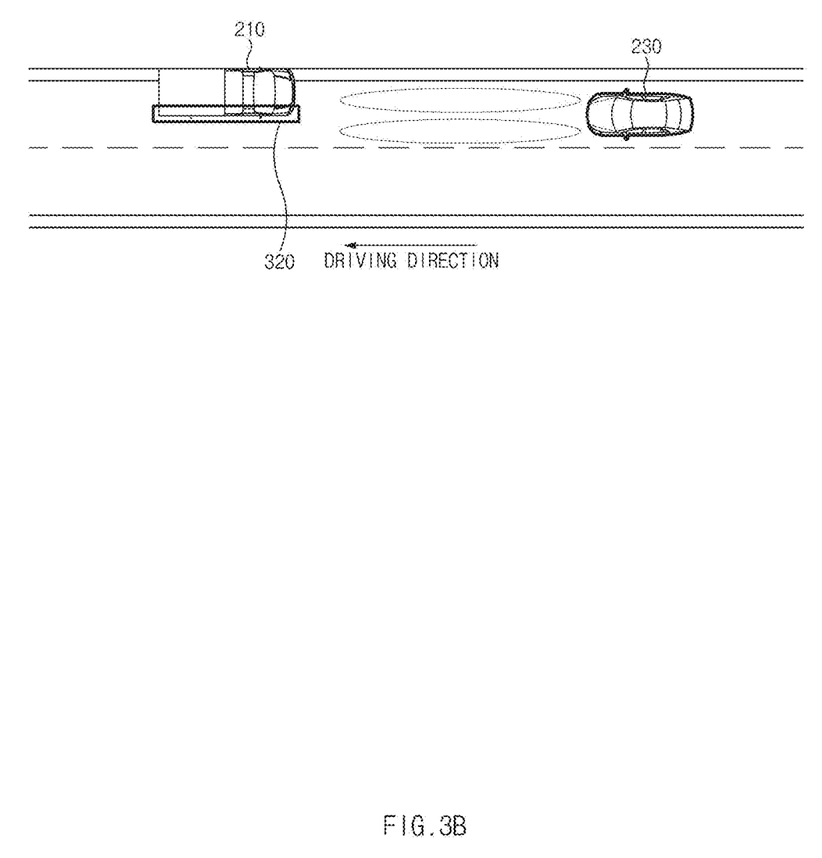
FIG. 3B is a diagram illustrating a situation in which a controller blinks a position lamp located on a right side of a vehicle and the controller is provided in an apparatus for inducing safe driving of a surrounding vehicle according to an embodiment of the present disclosure.

The controller 80 may selectively blink the position lamps mounted on the left side or the right side of the vehicle 210 as shown in FIGS. 3A and 3B according to the direction from which the surrounding vehicle 230 approaches the vehicle 210. In other words, the controller 80 may blink the position lamp of the vehicle 210 located in the direction of an inner lane. The controller 80 may sequentially blink the position lamps mounted on the left and right sides of the vehicle 210.

FIG. 3A is a diagram illustrating a situation in which a controller blinks a position lamp located on a left side of a vehicle. The controller is provided in an apparatus for inducing safe driving of a surrounding vehicle according to an embodiment of the present disclosure.

As shown in FIG. 3A, while the surrounding vehicle 230 is approaching the rear of the vehicle 210, which is parked in a driving lane, the controller 80 may blink a position lamp 310 located on the left side of the vehicle 210 to induce safe driving of the surrounding vehicle 230. In general, a driver parks the vehicle 210 next to the curb or guardrail of the outermost lane on the road. Therefore, the driver of the surrounding vehicle 230 approaching the rear of the vehicle 210 in the same lane may notice the blinking of the position lamp on the left side of the vehicle 210.

FIG. 3B is a diagram illustrating a situation in which a controller blinks a position lamp located on a right side of a vehicle. The controller is provided in an apparatus for inducing safe driving of a surrounding vehicle according to an embodiment of the present disclosure.

As shown in FIG. 3B, while the surrounding vehicle 230 is approaching the front of the vehicle 210, which is parked in a driving lane, the controller 80 may blink a position lamp 320 located on the right side of the vehicle 210 to induce safe driving of the surrounding vehicle 230. In general, a driver parks the vehicle 210 next to the curb or guardrail of the outermost lane on the road. Therefore, the driver of the surrounding vehicle 230 approaching the front of the vehicle 210 in the same lane may notice the blinking of the position lamp on the right side of the vehicle 210.

On the other hand, when the controller 80 detects both the pedestrian 220 and the surrounding vehicle 230 as objects, the controller 80 may blink an emergency light while issuing a warning through the buzzer 70.

In addition, the controller 80 may monitor a state of charge (SOC), voltage, or the like of a battery managed by a battery management system (BMS) through a vehicle network. The vehicle network may include a controller area network (CAN), a local interconnect network (LIN), a FlexRay, a media oriented systems transport (MOST), an ethernet, and the like. The battery may also supply power to the plurality of lamps, including the lamp 60.

When the voltage of the battery acquired through the vehicle network drops below a reference voltage, the controller 80 may stop (turn off) the blinking of the lamp 60 to prevent an over-discharge of the battery.

Figure 4:
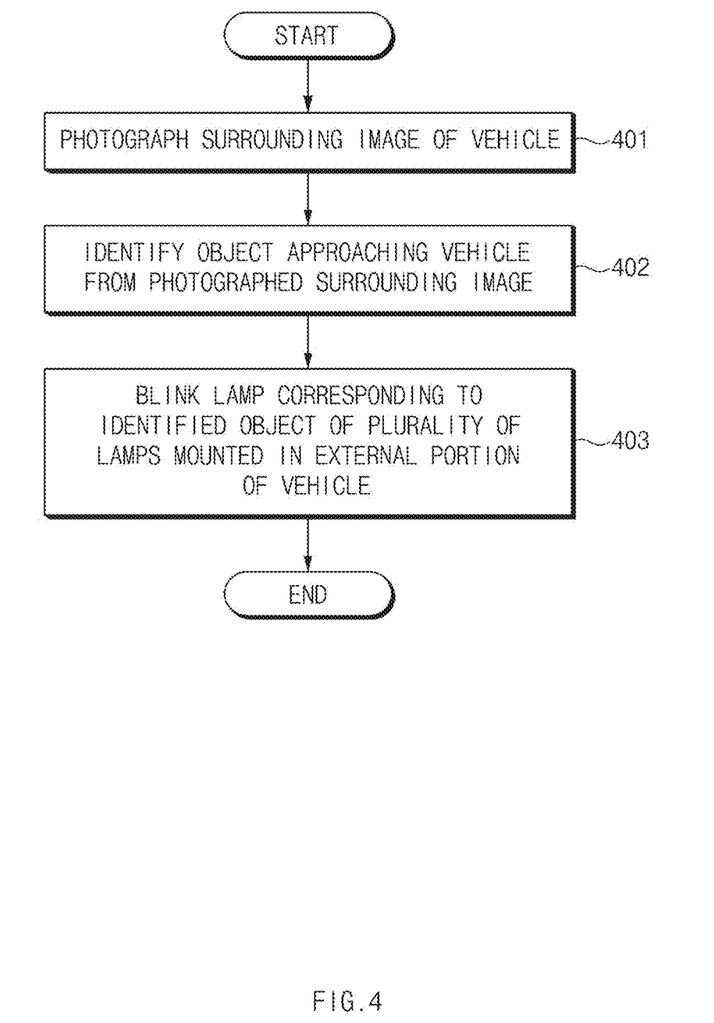
FIG. 4 is a flowchart of a method of inducing safe driving of a surrounding vehicle according to an embodiment of the present disclosure.

FIG. 4 is a flowchart of a method of inducing safe driving of a surrounding vehicle according to an embodiment of the present disclosure.

First, the camera 40 may photograph a surrounding image of a vehicle (401). In this embodiment, when the vehicle 210 is parked on a road at night, the camera 40 may be activated by the controller 80 to photograph the surrounding image of the vehicle 210.

Thereafter, the controller 80 may identify an object approaching the vehicle 210 in the surrounding image photographed by the camera 40 (402).

Subsequently, the controller 80 may blink a lamp according to the identified object among the plurality of lamps 60 mounted on the external surface of the vehicle 210 (403).

Figure 5:
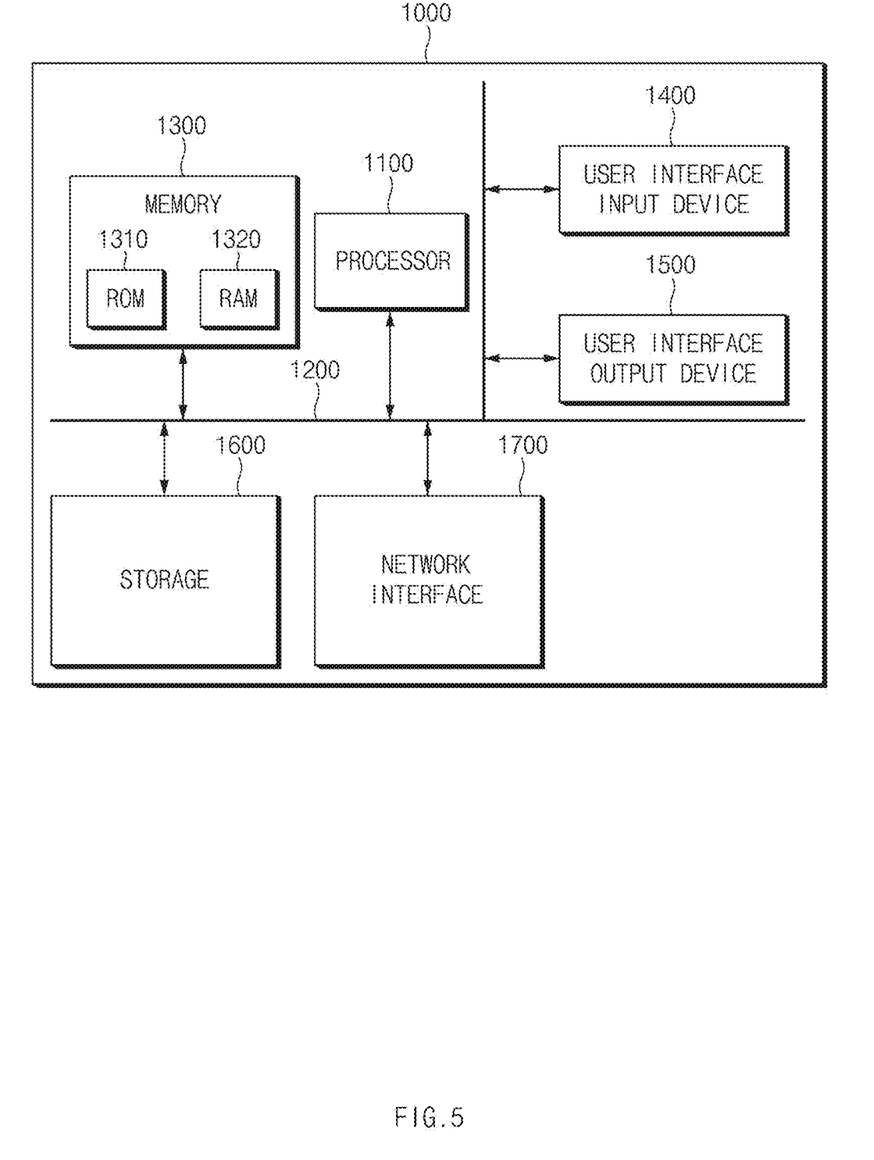
FIG. 5 is a diagram illustrating a computing system for performing a method of inducing safe driving of a surrounding vehicle according to an embodiment of the present disclosure.

FIG. 5 is a diagram illustrating a computing system for performing a method of inducing safe driving of a surrounding vehicle according to an embodiment of the present disclosure.

Referring to FIG. 5, the method of inducing safe driving of a surrounding vehicle according to an embodiment of the present disclosure as described above may be also implemented through a computing system 1000. The computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device configured to process instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (in other words, the memory 1300 and/or the storage 1600), such as a RAM, a flash memory, a ROM, an EPROM, an EEPROM, a register, a hard disk, a solid-state drive (SSD) a removable disk, and a CD-ROM. The storage medium may be coupled to the processor 1100. The processor 1100 may read information out of the storage medium and may record information in the storage medium. In another embodiment, the storage medium may be integrated with the processor 1100. The processor 1100 and the storage medium may reside in an application specific integrated circuit (ASIC). The ASIC may reside within a user terminal. In another embodiment, the processor 1100 and the storage medium may reside in the user terminal as separate components.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims. All the technical ideas within the scope equivalent to the claims should be included in the scope of the present disclosure.

The apparatus and method for inducing safe driving of a surrounding vehicle according to an embodiment of the present disclosure may be applied to a vehicle parked on a road and may identify an object based on an image obtained by photographing an approaching object by a camera, and to the identified object and blink a lamp of the vehicle according to the identified object, thus preventing a traffic accident that may occur due to the vehicle.

Hereinabove, although the present disclosure has been described with reference to specific embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. An apparatus for inducing safe driving of a surrounding vehicle, the apparatus comprising:
   a buzzer configured to output a warning sound;
   a plurality of lamps mounted on an external portion of a vehicle;
   a camera provided in the vehicle and configured to photograph a surrounding image when the vehicle is parked; and
   a controller configured to identify an object approaching the vehicle, when the vehicle is parked, in the surrounding image photographed by the camera and blink at least one lamp of the plurality of lamps according to the identified object,
   wherein the controller is configured to induce safe driving of the surrounding vehicle by blinking the at least one lamp provided in the vehicle while outputting the warning sound through the buzzer when the identified object includes a pedestrian as a first object and the surrounding vehicle as a second object.

2. The apparatus of claim 1, wherein the controller is configured to induce safe driving of the surrounding vehicle by blinking the at least one lamp provided in the vehicle when the identified object is a pedestrian.

3. The apparatus of claim 1, wherein the controller is configured to induce safe driving of the surrounding vehicle by blinking the at least one lamp provided in the vehicle when the identified object is the surrounding vehicle.

4. The apparatus of claim 3, further comprising:
a radar configured to measure a speed of the surrounding vehicle approaching the vehicle.

5. The apparatus of claim 4, wherein the controller is configured to:
wake up the radar when the identified object is the surrounding vehicle, and
blink the at least one lamp provided in the vehicle when the speed of the surrounding vehicle measured by the radar exceeds a threshold speed.

6. The apparatus of claim 5, wherein the controller is configured to selectively blink one or more lamps of the plurality of lamps mounted on a right side of the vehicle or one or more lamps of the plurality of lamps mounted on a left side of the vehicle according to a direction of the surrounding vehicle approaching the vehicle.

7. The apparatus of claim 6, wherein the controller is configured to blink the one or more lamps located on the left side of the vehicle when the surrounding vehicle approaches a rear of the vehicle and to blink the one or more lamps located on the right side of the vehicle when the surrounding vehicle approaches a front of the vehicle.

8. The apparatus of claim 1, wherein the controller is configured to:
monitor a voltage of a battery of the vehicle, and
turn off the at least one lamp of the plurality of lamps when the voltage of the battery drops below a reference voltage.

9. The apparatus of claim 1, further comprising:
an illumination sensor mounted on the external portion of the vehicle and configured to measure an ambient illumination; and
a navigation device configured to provide road information on a road on which the vehicle is parked.

10. The apparatus of claim 9, wherein the controller is configured to identify the object approaching the vehicle from the surrounding image photographed by the camera and to blink the at least one lamp according to the identified object when the vehicle is parked on the road at night.

11. The apparatus of claim 10, wherein the controller is configured to determine whether the identified object approaches the vehicle based on the road information.

12. A method for inducing safe driving of a surrounding vehicle, the method comprising:
photographing a surrounding image of a vehicle, when the vehicle is parked;
identifying an object approaching the vehicle, when the vehicle is parked, from the photographed surrounding image; and
blinking at least one lamp of a plurality of lamps mounted on an external portion of the vehicle according to the identified object when the vehicle is parked,
wherein the blinking of the at least one lamp includes
inducing safe driving of the surrounding vehicle by blinking the at least one lamp provided in the vehicle when the identified object is a pedestrian,
inducing safe driving of the surrounding vehicle by blinking the at least one lamp provided in the vehicle when the identified object is the surrounding vehicle, or
inducing safe driving of the surrounding vehicle by blinking the at least one lamp provided in the vehicle while outputting a warning sound when the identified object includes the pedestrian as a first object and the surrounding vehicle as a second object.

13. The method of claim 12, wherein the blinking is performed when the identified object is the surrounding vehicle and a speed of the surrounding vehicle approaching the vehicle exceeds a threshold speed.

14. The method of claim 13, wherein, when the identified object is the surrounding vehicle, the blinking includes selectively blinking one or more lamps of the plurality of lamps mounted on a right side of the vehicle or one or more lamps of the plurality of lamps mounted on a left side of the vehicle according to a direction of the surrounding vehicle approaching the vehicle.

15. The method of claim 14, wherein, when the identified object is the surrounding vehicle, the blinking further includes:
blinking the one or more lamps located on the left side of the vehicle when the surrounding vehicle approaches a rear of the vehicle; and
blinking the one or more lamps located on the right side of the vehicle when the surrounding vehicle approaches a front of the vehicle.

16. The method of claim 12, wherein the blinking of the at least one lamp of the plurality of lamps includes:
monitoring a voltage of a battery of the vehicle; and
turning off the at least one lamp of the plurality of lamps when the voltage of the battery drops below a reference voltage.

17. The method of claim 12, wherein the photographing of the surrounding image of the vehicle is performed when the vehicle is parked on a road at night.

* * * * *